(12) United States Patent
Lee et al.

(10) Patent No.: US 12,235,220 B2
(45) Date of Patent: Feb. 25, 2025

(54) METHOD OF DETERMINING ABNORMALITY OF DISPLAY MANUFACTURING FACILITY

(71) Applicant: Samsung Display Co., Ltd., Yongin-si (KR)

(72) Inventors: Jinwook Lee, Yongin-si (KR); Changyun Moon, Yongin-si (KR); Hyunjoon Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 119 days.

(21) Appl. No.: 18/297,737

(22) Filed: Apr. 10, 2023

(65) Prior Publication Data

US 2024/0011913 A1    Jan. 11, 2024

(30) Foreign Application Priority Data

Jul. 15, 2022    (KR) ........................ 10-2022-0087383

(51) Int. Cl.
*G01N 21/88*    (2006.01)
*G09G 3/00*    (2006.01)

(52) U.S. Cl.
CPC ............. *G01N 21/88* (2013.01); *G09G 3/006* (2013.01); *G09G 2360/145* (2013.01)

(58) Field of Classification Search
CPC ........... G01N 21/88; G01N 2021/9513; G01N 21/25; G09G 3/006; G09G 2360/145; G09G 2300/0426; G09G 2330/12; H10K 71/70; H10K 71/00; G01R 31/2635

USPC ...................................................... 356/237.1
See application file for complete search history.

(56) References Cited

U.S. PATENT DOCUMENTS

| | | |
|---|---|---|
| 7,446,739 B2 | 11/2008 | Nakanishi et al. |
| 2020/0159197 A1 | 5/2020 | Horiwaki et al. |
| 2022/0066905 A1 | 3/2022 | Lee et al. |

FOREIGN PATENT DOCUMENTS

| | | |
|---|---|---|
| JP | 2020-86784 | 6/2020 |
| KR | 10-0641375 | 10/2006 |
| KR | 10-2142205 | 8/2020 |
| KR | 10-2188568 | 12/2020 |
| KR | 10-2265298 | 6/2021 |

*Primary Examiner* — Md M Rahman
(74) *Attorney, Agent, or Firm* — KILE PARK REED & HOUTTEMAN PLLC

(57) ABSTRACT

A method of determining whether a display manufacturing facility is abnormal includes a first step of obtaining facility information data of facilities used to manufacture a display panel, a second step of preparing a display module by attaching a printed circuit board and a driving chip to the display panel, a third step of obtaining preliminary inspection data through an on-off test on the display module, a fourth step of associating the facility information data with the preliminary inspection data, establishing a database by repeatedly performing the first step to the fourth step, obtaining real-time inspection data through an on-off test on a display module to be inspected, determining whether the display module to be inspected is normal, and determining a facility causing abnormality of the display module, from the real-time inspection data by using the database, in case that the display module to be inspected is abnormal is determined.

6 Claims, 10 Drawing Sheets

METHOD OF DETERMINING ABNORMALITY OF DISPLAY MANUFACTURING FACILITY

CROSS REFERENCE TO RELATED APPLICATION(S)

This application claims priority to and benefits of Korean Patent Application No. 10-2022-0087383 under 35 U.S.C. § 119, filed on Jul. 15, 2022, in the Korean Intellectual Property Office (KIPO), the entire contents of which are incorporated herein by reference.

BACKGROUND

1. Technical Field

One or more embodiments relate to a method of determining whether a display manufacturing facility is abnormal or a method of determining abnormality of a display manufacturing facility, and more particularly, to a method of determining whether a display manufacturing facility is abnormal to readily check whether defects have occurred in a manufacturing process.

2. Description of the Related Art

In general, a display apparatus includes a pixel circuit for controlling whether each pixel emits light and a degree of emission, and a display device electrically connected to the pixel circuit. The pixel circuit may include conductive layers located between insulating layers, and the display device may also include various elements. Various manufacturing facilities used to form such various elements are used to manufacture the display apparatus. Accordingly, in case that any one of the manufacturing facilities is abnormal, defects occur in the manufactured display apparatus.

SUMMARY

In the related art, there is a problem in that it is not easy to check which of various manufacturing facilities used to manufacture a display apparatus is abnormal.

One or more embodiments include a method of determining whether a display manufacturing facility is abnormal to easily check whether defects have occurred in a manufacturing process. However, the embodiments are examples, and do not limit the scope of the disclosure.

Additional aspects will be set forth in part in the description which follows and, in part, will be apparent from the description, or may be learned by practice of the embodiments.

According to one or more embodiments, a method of determining whether a display manufacturing facility is abnormal may include a first step of obtaining facility information data of facilities used to manufacture a display panel, a second step of preparing a display module by attaching a printed circuit board and a driving chip to the display panel, a third step of obtaining preliminary inspection data through an on-off test on the display module, a fourth step of associating the facility information data with the preliminary inspection data, establishing a database by repeatedly performing the first step to the fourth step, obtaining real-time inspection data through an on-off test on a display module to be inspected, determining, from the real-time inspection data, whether the display module to be inspected is normal, and, determining a facility causing abnormality of the display module, from the real-time inspection data by using the database in case that the display module to be inspected is determined to be abnormal.

The preliminary inspection data and the real-time inspection data may be data with respect to same physical characteristics.

The preliminary inspection data and the real-time inspection data may include any one of data with respect to an average luminance of a display area, data with respect to a difference between a maximum luminance and a minimum luminance of the display area, and data with respect to color coordinates most different from normal color coordinates of the display area.

The database may store, as a facility causing abnormality, at least one of facilities used to manufacture a display panel included in a display module for which preliminary inspection data exceeding a preset range is obtained.

The determining of the facility causing abnormality may include selecting preliminary inspection data most similar to the real-time inspection data from among the preliminary inspection data stored in the database, and determining, as a facility causing abnormality, a facility used to manufacture a display panel included in the display module to be inspected, corresponding to a facility stored as the facility causing abnormality from among facilities used to manufacture a display panel included in a display module for which the preliminary inspection data is obtained.

The determining of the facility causing abnormality may include selecting preliminary inspection data most similar to the real-time inspection data from among the preliminary inspection data stored in the database, and determining, as a facility causing abnormality, a facility used to manufacture a display panel included in a display module for which the preliminary inspection data is obtained from among facilities used to manufacture a display panel included in the display module to be inspected.

Other aspects, features, and advantages of the disclosure will become more apparent from the detailed description, the claims, and the drawings.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION OF THE EMBODIMENTS

Figure 1:
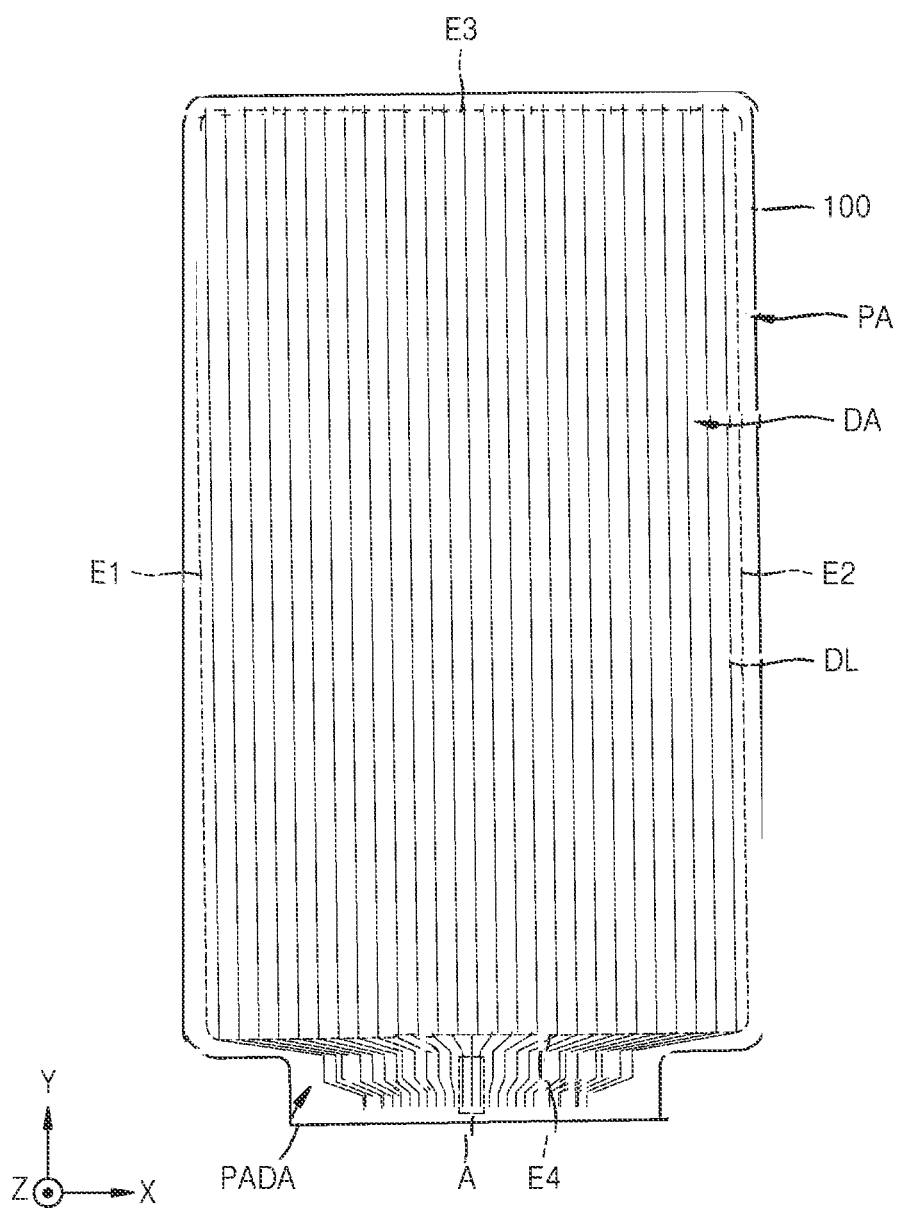
FIG. 1 is a conceptual view schematically illustrating a state during a process of manufacturing a display apparatus in a method of determining whether a display manufacturing facility is abnormal, according to an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the figures, to explain aspects of the description. As used herein, the term "and/or" includes any and all combinations of one or more of the associated listed items. For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, when an embodiment may be implemented differently, a specific process order may be performed differently from the described order. For example, two consecutively described processes may be performed substantially at the same time or performed in an order opposite to the described order. Also, like reference numerals denote like elements.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As the disclosure allows for various changes and numerous embodiments, certain embodiments will be illustrated in the drawings and described in the detailed description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described in detail with reference to the accompanying drawings, wherein the same or corresponding elements are denoted by the same reference numerals throughout and a repeated description thereof is omitted.

It will be understood that when a component, such as a layer, a film, a region, or a plate, is referred to as being "on" or "over" another component, the component may be directly on the other component or intervening components may be present therebetween. Also, sizes of components in the drawings may be exaggerated or contracted for convenience of explanation. For example, because sizes and thicknesses of elements in the drawings are arbitrarily illustrated for convenience of explanation, the disclosure is not limited thereto.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

In the following embodiments, an X-axis, a Y-axis, and a Z-axis are not limited to three axes of a rectangular coordinate system, and may be interpreted in a broader sense. For example, the X-axis, the Y-axis, and the Z-axis may be perpendicular to one another, or may represent different directions that are not perpendicular to one another.

Figure 2:
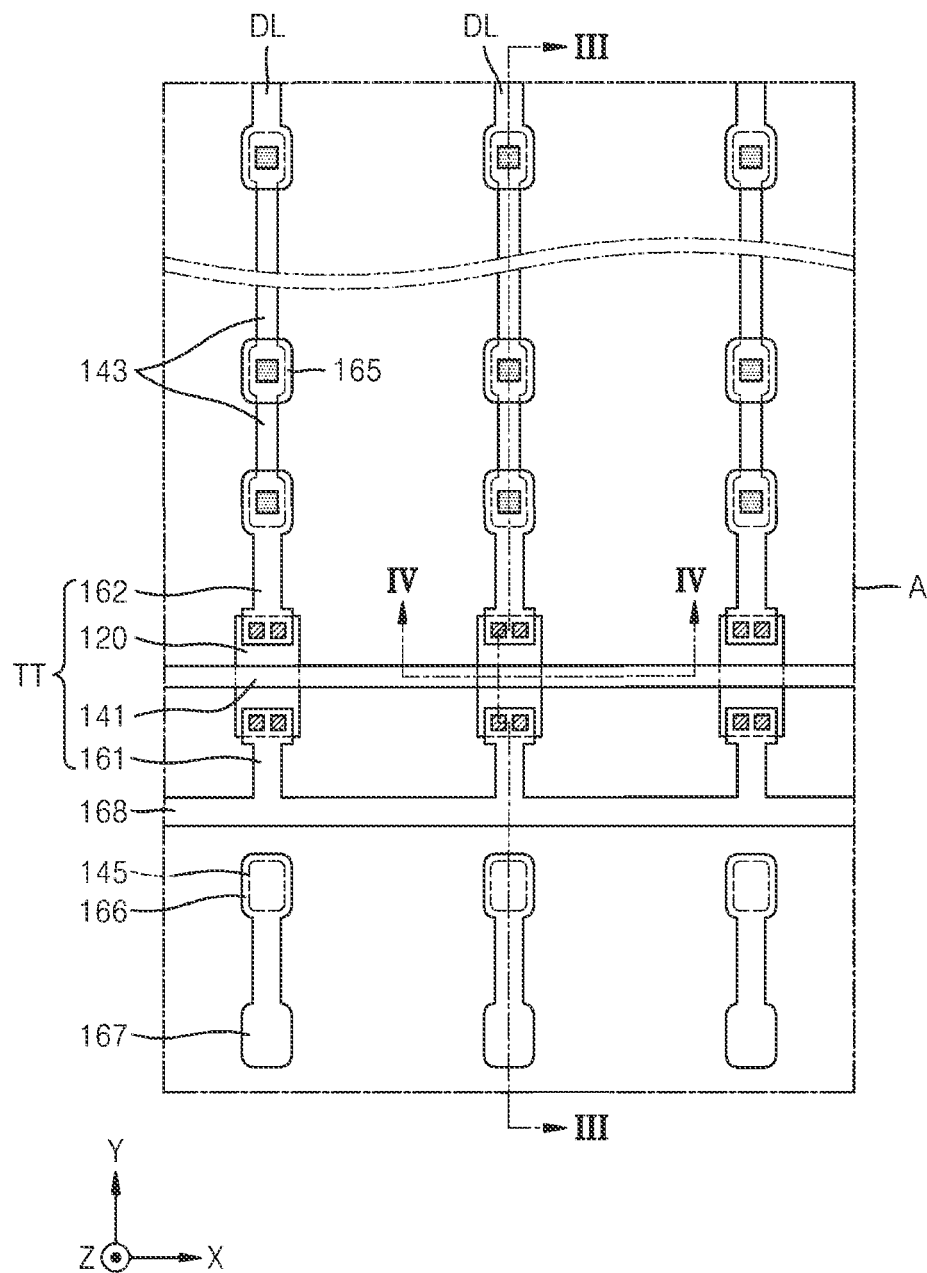
FIG. 2 is a conceptual view schematically illustrating a portion A of FIG. 1.
Figure 3:
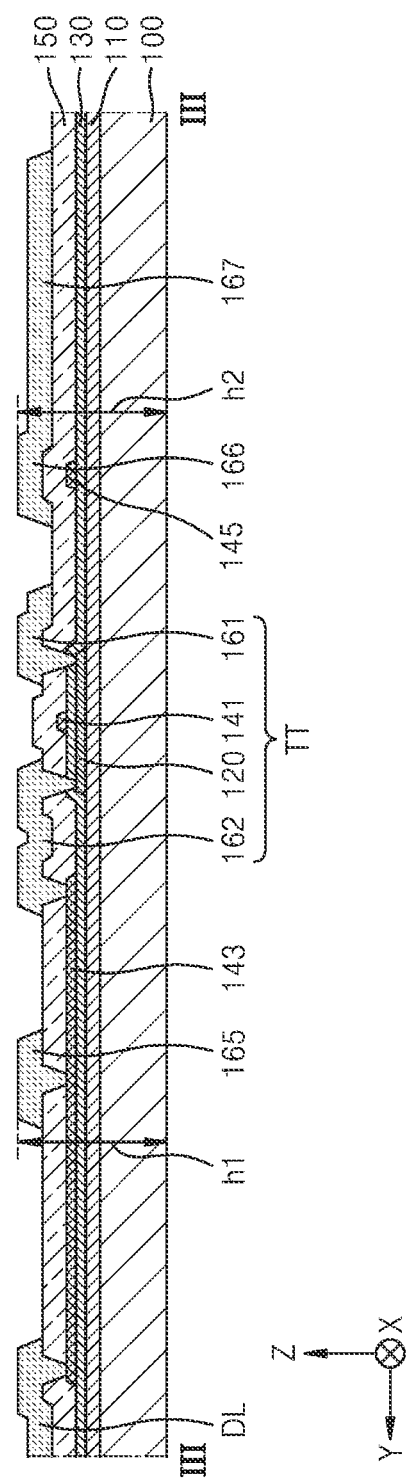
FIG. 3 is a schematical cross-sectional view taken along line III-III of FIG. 2.
Figure 4:
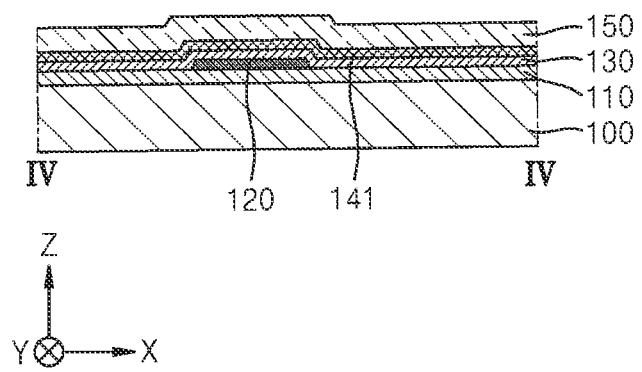
FIG. 4 is a schematical cross-sectional view taken along line IV-IV of FIG. 2.

FIG. 1 is a conceptual view schematically illustrating a state during a process of manufacturing a display apparatus in a method of determining whether a display manufacturing facility is abnormal, according to an embodiment. FIG. 2 is a conceptual view schematically illustrating a portion A of FIG. 1. FIG. 3 is a schematical cross-sectional view taken along line III-III of FIG. 2. FIG. 4 is a schematical cross-sectional view taken along line IV-IV of FIG. 2.

A display apparatus used to obtain data in a method of determining whether a display manufacturing facility is abnormal according to the embodiment may include a display area DA where pixels are located and a peripheral area PA located outside the display area DA as shown in FIG. 1. Accordingly, a substrate 100 may include the display area DA and the peripheral area PA. The peripheral area PA may include a pad area PADA to which various electronic devices, a printed circuit board, or the like are electrically attached.

FIG. 1 may be a plan view illustrating a state of the substrate 100 or the like during a manufacturing process. For example, FIG. 1 may be a plan view illustrating a display panel in a state before a printed circuit board or a driving chip is attached, rather than a final display apparatus. The final display apparatus according to the embodiment may be an electronic device such as a smartphone, a mobile phone, a navigation device, a game console, a TV, a vehicle head unit, a laptop computer, a tablet computer, a personal media player (PMP), a personal digital assistant (PDA), or the like. Also, the electronic device may be a flexible device. FIG. 1 may illustrate the display panel in case that the final display apparatus is, for example, a smartphone.

In the final display apparatus, a part of the substrate 100 or the like may be bent, in order to minimize an area of the peripheral area PA recognized by a user. For example, the peripheral area PA may include a bending area, and the bending area may be located between the pad area PADA and the display area DA. The substrate 100 may be bent in the bending area, so that at least a part of the pad area PADA overlaps the display area DA. A bending direction may be set so that the pad area PADA is located behind the display area DA rather than covering the display area DA. Accordingly, the user may recognize that the display area DA occupies most of the display apparatus.

Also, the substrate 100 may include any of various flexible or bendable materials, for example, a polymer resin such as polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), cellulose acetate propionate (CAP), the like, or a combination thereof. However, various modifications may be made. For example, the substrate 100 may have a multi-layer structure including two layers each including a polymer resin and a barrier layer including an inorganic material (e.g., silicon oxide, silicon nitride, silicon oxynitride, or the like) and located between the two layers. Furthermore, in case that the substrate 100 is not bent, the substrate 100 may be formed of glass or the like.

The display area DA may have a substantially rectangular or square shape. However, as shown in FIG. 1, the display area DA may not have sharp corners. In detail, the display area DA may include a first edge E1 and a second edge E2 facing each other (in the X-axis direction), and a third edge E3 and a fourth edge E4 facing each other (in the Y-axis direction) and located between the first edge E1 and the second edge E2. The pad area PADA may be adjacent to the fourth edge E4. A portion connecting the first edge E1 and the fourth edge E4 to each other may have a round shape. A portion connecting the second edge E2 and the fourth edge E4 to each other in the display area DA may also have a round shape, and other portions of the display area DA may also have round shapes.

As shown in FIG. 2, the display panel may include test thin-film transistors TT located in the peripheral area PA. Specifically, the test thin-film transistors TT may be located in the pad area PADA among the peripheral area PA. The test thin-film transistors TT may be thin-film transistors for determining whether pixels of the display area DA normally operate in a manufacturing process.

Each of the test thin-film transistors TT may include a semiconductor layer 120, a gate electrode 141, a source electrode 161, and a drain electrode 162, as shown in FIGS. 2 to 4. The semiconductor layer 120 may include amorphous silicon, polycrystalline silicon, an organic semiconductor material, or the like. In order to ensure insulation between the semiconductor layer 120 and the gate electrode 141, a gate insulating film 130 including an inorganic material such as silicon oxide, silicon nitride, and/or silicon oxynitride may be located between the semiconductor layer 120 and the gate electrode 141. An interlayer insulating film 150 including an inorganic material such as silicon oxide, silicon nitride, and/or silicon oxynitride may be located on the gate electrode 141. The source electrode 161 and the drain electrode 162 may be located on the interlayer insulating film 150. Such an insulating film including an inorganic material (e.g., the gate insulating film 130, interlayer insulating film 150) may be formed by using chemical vapor deposition (CVD) or atomic layer deposition (ALD). This may apply to the following embodiments and modifications thereof.

A buffer layer 110 including an inorganic material such as silicon oxide, silicon nitride, and/or silicon oxynitride may be located between the test thin-film transistor TT and the substrate 100. The buffer layer 110 may increase smoothness of a top surface of the substrate 100, or may prevent or minimize penetration of impurities from the substrate 100 or the like into the semiconductor layer 120 of the test thin-film transistor TT.

The gate electrodes 141 of the test thin-film transistors TT may be electrically connected to each other. For example, the gate electrode 141 of any one of the test thin-film transistors TT may be electrically connected to the gate electrode 141 of the other of the test thin-film transistors TT. For example, as shown in FIG. 2, the gate electrodes 141 of the test thin-film transistors TT may be integral with each other. In FIG. 2, the gate electrodes 141 that are integral with each other extend in a direction (e.g., the X-axis direction). As another example, the gate electrodes 141 of the test thin-film transistors TT may be spaced apart from each other and may be electrically connected to each other by bridge wirings. The gate electrodes 141 and the bridge wirings may be located on a virtual straight line extending in the direction (e.g., the X-axis direction).

The gate electrode 141 may be formed of a metal such as molybdenum (Mo) or aluminum (Al), and may be formed by using sputtering or the like. The gate electrode 141 may have a single or multi-layer structure. For example, the gate electrode 141 may have a two-layer structure including Mo/Al.

Each of the source electrode 161 and the drain electrode 162 may include a metal such as titanium (Ti) or aluminum (Al), and may have a single or multi-layer structure. For example, each of the source electrode 161 and the drain electrode 162 may have a three-layer structure including Ti/Al/Ti.

As shown in FIG. 1, data lines DL may cross (or intersect) the display area DA (e.g., in the Y-axis direction) and may extend to the peripheral area PA. Each of the test thin-film transistors TT may be electrically connected to a corresponding one of the data lines DL. Accordingly, when electrical signals are simultaneously applied to the gate electrodes 141 which are electrically connected to each other of the test thin-film transistors TT, channels may be simultaneously formed in the semiconductor layers 120 of the test thin-film transistors TT. As such, when the test thin-film transistors TT are simultaneously turned on, an electrical signal from a test signal line 168 may be transmitted to the data lines DL. Accordingly, pixels of the display area DA electrically connected to the data lines DL may emit light, thereby making it possible to check whether the pixels in the display area DA have defects.

As described above, the plurality of data lines DL may cross the display area DA and extend to the peripheral area PA. The data lines DL may include a same material, for example, a metal such as titanium (Ti) or aluminum (Al), as a material of the source electrode 161 and the drain electrode 162 of the test thin-film transistor TT, and may have a single or multi-layer structure. Furthermore, the data lines DL may be located on a same layer as a layer on which the source electrode 161 and the drain electrode 162 are located. Each of the test thin-film transistors TT may be electrically connected to a corresponding one of the data lines DL, by a connection wiring 143. For example, the connection wirings 143 may connect the data lines DL to the test thin-film transistors TT.

The connection wirings 143 may include a same material, for example, a metal such as molybdenum (Mo) or aluminum (Al), as a material of the gate electrodes 141, and may have a single or multi-layer structure. Furthermore, the connection wirings 143 may be located on a same layer as a layer on which the gate electrodes 141 are located. An end of the connection wiring 143 close to the data line DL (e.g., in a +Y-axis direction, see, e.g., FIG. 3) may be connected to the data line DL located over the connection wiring 143 through a contact hole formed in the interlayer insulating film 150, and an end of the connection wiring 143 close to the test thin-film transistor TT (e.g., in a -Y-axis direction) may be connected to the drain electrode 162 located over the connection wiring 143 through a contact hole formed in the interlayer insulating film 150. The source electrodes 161 of the test thin-film transistors TT may be connected to the test signal line 168 (that extends in the X-axis direction). Specifically, the source electrodes 161 may be integral with the test signal line 168.

As shown in FIGS. 2 and 3, the display apparatus may further include output pads 165. Each of the output pads 165 may be located over a corresponding one of the connection wirings 143 to contact the corresponding one of the connection wirings 143. Each of the output pads 165 may include a same material, for example, a metal such as titanium (Ti) or aluminum (Al), as a material of the source electrode 161 and the drain electrode 162 of the test thin-film transistor TT, and may have a single or multi-layer structure. As another example, the output pads 165 may have a three-layer structure including Ti/Al/Ti. Furthermore, the output pads 165 may be located on a same layer as a layer on which the source electrode 161 and the drain electrode 162 are located. Accordingly, the output pads 165 may be connected to the connection wirings 143 located under the output pads 165 through a contact hole formed in the interlayer insulating film 150.

The display apparatus may further include input pads 166. The input pads 166 may be located at another side opposite to a side (in the +Y-axis direction) of the test thin-film transistors TT where the output pads 165 are located. Each of the input pads 166 may include a same material, for example, a metal such as titanium (Ti) or aluminum (Al), as a material of the source electrode 161 and the drain electrode 162 of the test thin-film transistor TT, and may have a single or multi-layer structure. As another example, the input pads 166 may have a three-layer structure including Ti/Al/Ti. Furthermore, the input pads 166 may be located on a same layer as a layer on which the source electrode 161 and the drain electrode 162 are located.

The input pads 166 and the output pads 165 may be connected to a driving chip 180 (see, e.g., FIG. 7) included in the display module or the display device as described below. Information about an image to be provided in the display area DA may be input to the driving chip 180. To this end, the input pads 166 may extend away from the test thin-film transistors TT (in the -Y-axis direction), and portions 167 of the input pads 166 far from the test thin-film transistors TT may be electrically connected to output terminals 191 of a printed circuit board 190 (see, e.g., FIG. 7) included in the display module or the display apparatus.

As such, input terminals 182 of the driving chip 180 may be connected to the input pads 166, and output terminals 181 of the driving chip 180 may be connected to the output pads 165. The input terminals 182 of the driving chip 180 and the output terminals 181 of the driving chip 180 may be attached to the display panel. In order to stably position the driving chip 180, a height h1 between a bottom surface of the substrate 100 and top surfaces of the output pads 165 may need to be equal to a height h2 between the bottom surface of the substrate 100 and top surfaces of the input pads 166.

To this end, because the connection wirings 143 are located under the output pads 165, step difference adjusting part 145 may be located under a portion of each of the input pads 166 close to the test thin-film transistors TT (in the +Y-axis direction). The step difference adjusting part 145 may include a same material, for example, a metal such as molybdenum (Mo), aluminum (Al), or the like, as a material of the connection wirings 143, that is, a same material as a material of the gate electrodes 141, and may have a single or multi-layer structure. Unlike in FIGS. 2 and 3, a step difference adjusting part may also be located under the portion 167 of each of the input pads 166 far from the test thin-film transistors TT (in the -Y-axis direction), that is, the portion 167 connected to the output terminal 191 of the printed circuit board 190.

Figure 5:
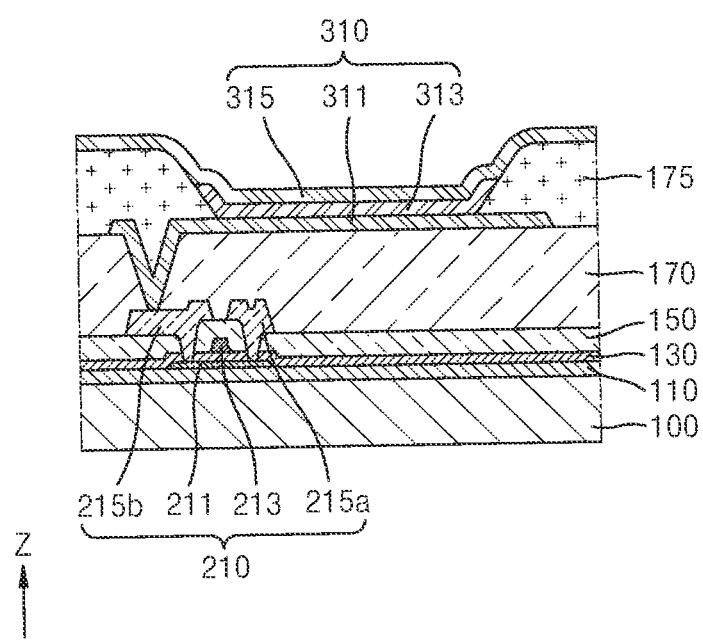
FIG. 5 is a cross-sectional view schematically illustrating a portion in a display area of FIG. 1.

FIG. 5 is a cross-sectional view schematically illustrating a portion in the display area DA of FIG. 1. As shown in FIG. 5, a display device 310 and a thin-film transistor 210 to which the display device 310 is electrically connected may be located in the display area DA of the substrate 100. In FIG. 5, an organic light-emitting device may be located as the display device 310 in the display area DA. In case that the organic light-emitting device is electrically connected to the thin-film transistor 210, it may mean that a pixel electrode 311 is electrically connected to the thin-film transistor 210.

A semiconductor layer 211, a gate electrode 213, a source electrode 215a, and a drain electrode 215b of the thin-film transistor 210 in the display area DA may include the same material and may be located on a same layer as the semiconductor layer 120, the gate electrode 141, the source electrode 161, and the drain electrode 162 of the test thin-film transistor TT of the peripheral area PA. Although the thin-film transistor 210 includes the source electrode 215a and the drain electrode 215b in FIG. 5, the disclosure is not limited thereto. For example, the source electrode 215a and/or the drain electrode 215b may be a part of a wiring. As another example, the thin-film transistor 210 may not include the source electrode 215a and/or the drain electrode 215b, and a source region of the semiconductor layer 211 may function as a source electrode and/or a drain region may function as a drain electrode. For example, the source region of the semiconductor layer 211 of the thin-film transistor 210 may be integral with a drain region of another thin-film transistor, and the drain electrode of another thin-film transistor may be electrically connected to the source electrode of the thin-film transistor 210.

A planarization layer 170 may be located on the thin-film transistor 210. For example, in case that the display device 310 (e.g., an organic light-emitting device) is located on the thin-film transistor 210 as shown in FIG. 5, the planarization layer 170 may substantially planarize a top surface of the thin-film transistor 210. The planarization layer 170 may be formed of an organic material such as acryl, benzocyclobutene (BCB), or hexamethyldisiloxane (HMDSO). Although the planarization layer 170 has a single-layer structure in FIG. 5, various modifications may be made. For example, the planarization layer 170 may have a multi-layer structure.

In the display area DA of the substrate 100, the display device 310 may be located on the planarization layer 170. The display device 310 may be an organic light-emitting device including the pixel electrode 311, a counter electrode 315, and an intermediate layer 313 located between the pixel electrode 311 and the counter electrode 315 and including an emission layer.

The pixel electrode 311 may be electrically connected to the thin-film transistor 210 by contacting one of the source electrode 215a and the drain electrode 215b through an opening portion formed in the planarization layer 170 or the like as shown in FIG. 5. The pixel electrode 311 may include a light-transmitting conductive layer formed of a light-transmitting conductive oxide such as ITO, $In_2O_3$, or IZO, and a reflective layer formed of a metal such as aluminum (Al) or silver (Ag). For example, the pixel electrode 311 may have a three-layer structure including ITO/Ag/ITO.

A pixel-defining film 175 may be located on the planarization layer 170. The pixel-defining film 175 may define a pixel by having an opening corresponding to each sub-pixel, that is, an opening through which at least a central portion of the pixel electrode 311 is exposed. Also, as shown in FIG. 5, the pixel-defining film 175 may increase a distance between an edge of the pixel electrode 311 and the counter electrode 315 over the pixel electrode 311, to prevent an arc or the like from occurring on the edge of the pixel electrode 311. The pixel-defining film 175 may be formed of an organic material such as polyimide or hexamethyldisiloxane (HMDSO).

The intermediate layer 313 of the organic light-emitting device may include a low molecular weight material or a high molecular weight material. In case that the intermediate layer 313 has a low molecular weight material, the intermediate layer 313 may have a single or multi-layer structure in which a hole injection layer (HIL), a hole transport layer (HTL), an emission layer (EML), an electron transport layer (ETL), and an electron injection layer (EIL) are stacked, and may be formed by using vacuum deposition. In case that the intermediate layer 313 includes a high molecular weight material, the intermediate layer 313 may have a structure including an HTL and an EML. The HTL may include poly(3,4-ethylenedioxythiophene) (PEDOT), and the EML may include a polymer material such as a polyphenylene vinylene (PPV)-based material or a polyfluorene-based material. The intermediate layer 313 may be formed by using screen printing, inkjet printing, laser induced thermal imaging (LITI), or the like.

The intermediate layer 313 is not necessarily limited thereto, and may have any of various structures. Layers other than the emission layer of the intermediate layer 313 may be integral over pixel electrodes 311. The emission layer may be formed to correspond to each of pixel electrodes 311.

The counter electrode 315 may be located in the display area DA to cover the display area DA. For example, the counter electrode 315 may be integral with organic light-emitting devices and may correspond to the pixel electrodes 311. The counter electrode 315 may include a light-transmitting conductive layer formed of ITO, $In_2O_3$, or IZO, and may include a semi-transmissive film including a metal such as Al or Ag. For example, the counter electrode 315 may include a semi-transmissive film including MgAg.

Because each organic light-emitting device may be readily damaged by external moisture, oxygen, or the like, an encapsulation layer (not shown) may cover and protect the organic light-emitting device. The encapsulation layer may cover the display area DA, and may extend to at least a part of the peripheral area PA. The encapsulation layer may include a first inorganic encapsulation layer, an organic encapsulation layer, and a second inorganic encapsulation layer.

After a display panel is prepared, an on-off test may be performed on the display panel. In detail, an electrical signal may be applied to the common gate electrode 141 of the test thin-film transistors TT located in the peripheral area PA, to simultaneously form channels in the test thin-film transistors TT and simultaneously turn on the test thin-film transistors TT. Accordingly, an electrical signal from the test signal line 168 may be transmitted through the test thin-film transistors TT to the data lines DL electrically connected to the test thin-film transistors TT. Accordingly, pixels of the display area DA electrically connected to the data lines DL may emit light, thereby making it possible to check whether the pixels in the display area DA have defects. In particular, because a same electrical signal is transmitted from the test signal line 168 to the pixels of the display area DA electrically connected to the data lines DL through the test thin-film transistors TT, it may be checked whether there exist pixels emitting light with different luminances.

Of course, the test thin-film transistors TT including the common gate electrode 141 may be connected to the data lines DL connected to pixels emitting red light. A common gate electrode of the test thin-film transistors connected to pixels emitting green light may be different from the common gate electrode 141 shown in FIG. 2. The pixels emitting red light may be checked for defects or the pixels emitting green light may be checked for defects. This may apply to pixels emitting blue light.

The pixels emitting red light, the pixels emitting green light, and the pixels emitting blue light may simultaneously emit light so that the display area DA displays a white image, and in this state, color coordinates may be checked and it may be checked how different the color coordinates are from color coordinates of ideal white light. Of course, color coordinates may be checked in a state where only the pixels emitting red light emit light and it may be checked how different the color coordinates are from color coordinates of ideal red light; color coordinates may be checked in a state where only the pixels emitting green light emit light and it may be checked how different the color coordinates are from color coordinates of ideal green light; and color coordinates may be checked in a state where only the pixels emitting blue light emit light and it may be checked how different the color coordinates are from color coordinates of ideal blue light.

As such, in case that the on-off test is performed on the display panel and it is determined that the display panel is normal, facility information data of facilities used to manufacture the display panel may be obtained.

Figure 6:
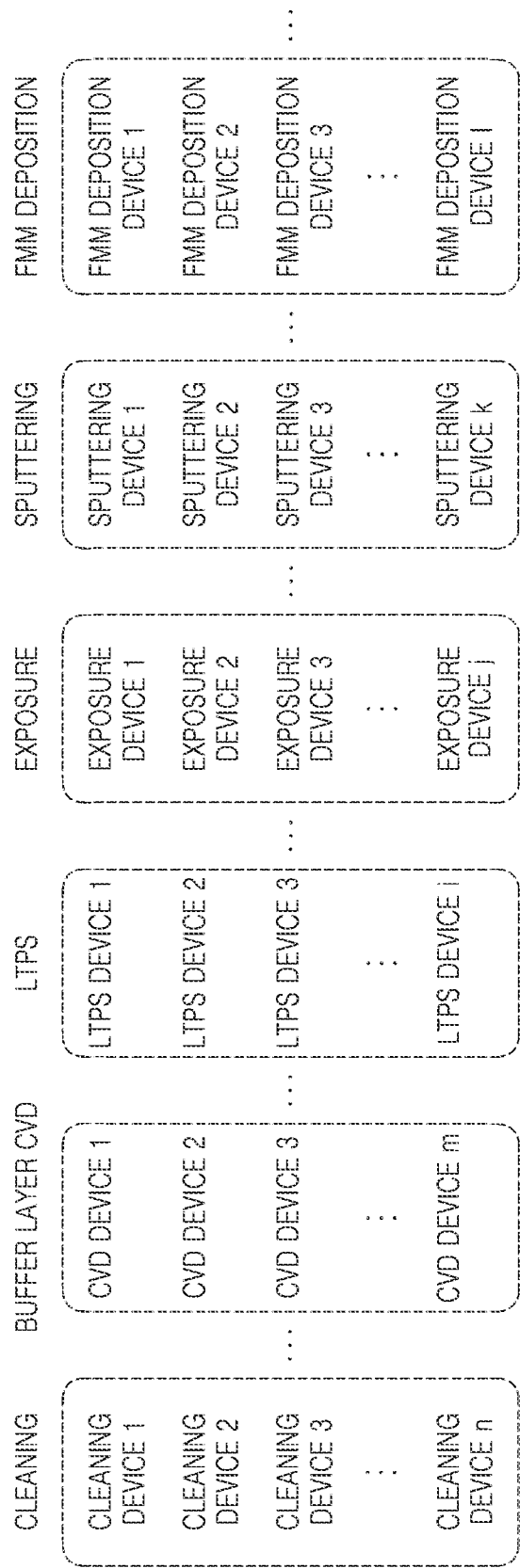
FIG. 6 is a conceptual view schematically illustrating various manufacturing facilities used to manufacture a display apparatus.

FIG. 6 is a conceptual diagram schematically illustrating various manufacturing facilities used to manufacture a display apparatus. As shown in FIG. 6, to manufacture a display apparatus, various manufacturing facilities such as a cleaning device used to clean the substrate 100 or the like, a buffer layer chemical vapor deposition (CVD) device used to form the buffer layer 110 on the substrate 100, a low temperature polysilicon (LTPS) device used to form an amorphous silicon layer on the buffer layer 110 and then crystalize the amorphous silicon layer, an exposure device used to pattern, for example, form holes in various layers, a sputtering device used to form a metal layer, and a fine metal mask (FMM) deposition device used to form a patterned organic material layer such as an emission layer may be used. Each of the manufacturing facilities may not be used alone but several facilities may be used. In FIG. 6, for example, n cleaning devices, m buffer layer CVD devices, i LTPS devices, j exposure devices, k sputtering devices, and l FMM deposition devices may be used. Here, n, m, i, j, k, and l may each be a natural number greater than 1, and be a same or different from each other.

A first display panel may be manufactured by using a first cleaning device, a first CVD device, a first LTPS device, a first exposure device, a first sputtering device, and a first FMM deposition device. A second display panel may be manufactured by using the first cleaning device, the first CVD device, the first LTPS device, a second exposure device, the first sputtering device, and the first FMM deposition device. A third display panel may be manufactured by using a third cleaning device, the first CVD device, the first LTPS device, the second exposure device, the first sputtering device, and the first FMM deposition device. Facility information data of facilities used to manufacture a display panel, for example, facility information data of facilities used for the first display panel may include information of the first cleaning device, the first CVD device, the first LTPS device, the first exposure device, the first sputtering device, and the first FMM deposition device. Facility information data of facilities used for the second display panel may include information of the first cleaning device, the first CVD device, the first LTPS device, the second exposure device, the first sputtering device, and the first FMM deposition device. Facility information data of facilities used for the third display panel may include information of the third cleaning device, the first CVD device, the first LTPS device, the first exposure device, the first sputtering device, and the first FMM deposition device.

Figure 7:
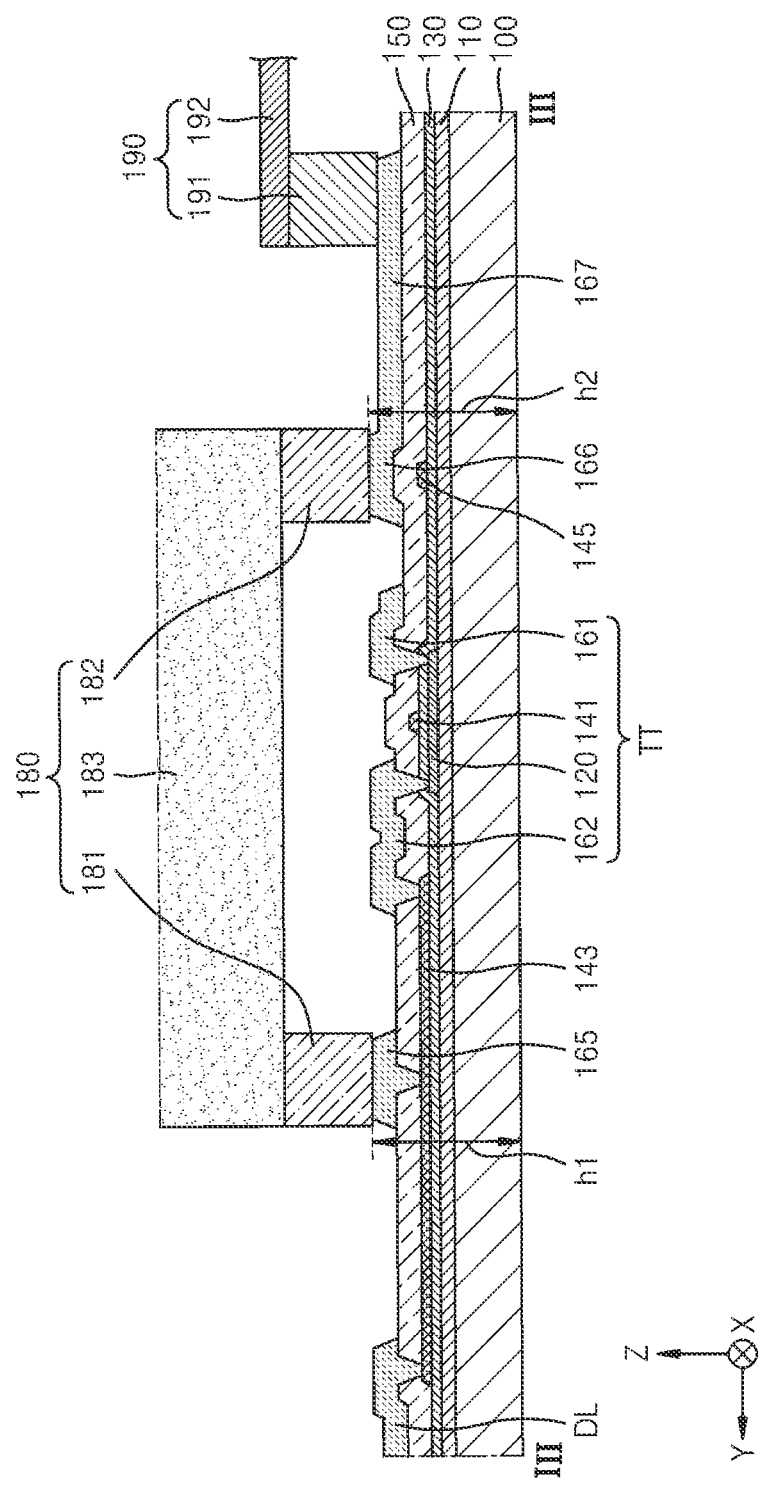
FIG. 7 is a cross-sectional view schematically illustrating a state during a process of manufacturing a display apparatus in a method of determining whether a display manufacturing facility is abnormal, according to an embodiment.

As such, after the facility information data of the facilities used to manufacture the display panel is obtained, as shown in FIG. 7, a display module may be prepared by attaching the printed circuit board 190 and the driving chip 180 to the display panel. FIG. 7 may be a schematical cross-sectional view taken along line III-III of FIG. 2, illustrating a display module in which the printed circuit board 190 and the driving chip 180 are attached to a display panel.

The driving chip 180 may include a body 183, and output terminals 181 and input terminals 182 located on both sides of the body 183. Although one output terminal 181 and one input terminal 182 of the driving chip 180 are illustrated in the schematical cross-sectional view of FIG. 7, the driving chip 180 may include output terminals 181 and input terminals 182 (arranged in the X-axis direction). The driving chip 180 may be, for example, an integrated circuit (IC) chip.

The input terminals 182 of the driving chip 180 may be connected to the input pads 166 of the display panel, and the output terminals 181 of the driving chip 180 may be connected to the output pads 165 of the display panel. Accordingly, in case that the display module or the display apparatus is driven, an electrical signal may be transmitted from the driving chip 180 through the output terminals 181 of the driving chip 180, the output pads 165, and the connection wirings 143 to the data lines DL, and may be, as a result, transmitted to pixels in the display area DA.

Information about an image to be displayed in the display area DA may be input to the driving chip 180 through the input terminals 182 of the driving chip 180. To this end, the display module may include the printed circuit board 190 including a plate 192 and the output terminals 191. The input pads 166 of the display panel may extend away from the test thin-film transistors TT (e.g., in the −Y-axis direction), and the output terminals 191 of the printed circuit board 190 may be electrically connected to the portions 167 of the input pads 166 far from the test thin-film transistors TT.

As the input terminals 182 of the driving chip 180 are connected to the input pads 166, and the output terminals 181 of the driving chip 180 are connected to the output pads 165, as shown in FIG. 7, the driving chip 180 may be located over the test thin-film transistors TT. In order to stably position the driving chip 180, a height h1 between a bottom surface of the substrate 100 and top surfaces of the output pads 165 needs to be equal to a height h2 between the bottom surface of the substrate 100 and top surfaces of the input pads 166.

To this end, as described above, the step difference adjusting part 145 may be located under a portion of each of the input pads 166 close to the test thin-film transistors TT (in the +Y-axis direction). Unlike in FIG. 7, a step difference adjusting part may also be located under the portion 167 of each of the input pads 166 far from the test thin-film transistors TT (in the −Y-axis direction), that is, the portion 167 connected to the output terminal 191 of the printed circuit board 190.

Although the input terminals 182 of the driving chip 180 directly contact the input pads 166 in FIG. 7, the disclosure is not limited thereto. For example, an anisotropic conductive film or the like may be located between the input terminals 182 of the driving chip 180 and the input pads 166. This may be applied between the output pads 181 of the driving chip 180 and the output pads 165, and may also be applied between the portions 167 of the input pads 166 far from the test thin-film transistors TT and the output terminals 191 of the printed circuit board 190. This may apply to the following embodiments and modifications thereof.

After the display module is prepared, preliminary inspection data may be obtained through an on-off test on the display module. In a process of obtaining the preliminary inspection data, a test signal may be applied to the driving chip 180 through the printed circuit board 190 rather than using the test thin-film transistors TT used in an on-off test on a display panel, and a signal from the driving chip 180 may be transmitted through the output pads 165 to the data lines DL. As a result, pixels of the display area DA electrically connected to the data lines DL may emit light, thereby making it possible to check whether the pixels in the display area DA have defects. The signal transmitted through the driving chip 180 to the data lines DL may be a signal obtained by performing gamma correction or the like in the driving chip 180.

For reference, during the on-off test for obtaining the preliminary inspection data, the test thin-film transistors TT may be maintained in an off state. In detail, in case that the test thin-film transistors TT are PMOS transistors that are turned on when a low signal is applied to the gate electrodes 141, the test thin-film transistors TT may be maintained in an off state by applying a high signal, instead of applying no signal, to the gate electrodes 141.

As such, in case that the preliminary inspection data is obtained, it may be checked whether there exist pixels emitting light with different luminances, rather than an intended luminance, among the pixels of the display area DA. In the display area DA, pixels emitting red light may be checked for defects, pixels emitting green light may be checked for defects, or pixels emitting blue light may be checked for defects.

In case that the preliminary inspection data is obtained, the pixels emitting red light, the pixels emitting green light, and the pixels emitting blue light may simultaneously emit light so that the display area DA displays a white image, and in this state, color coordinates may be checked and it may be checked how different the color coordinates are from color coordinates of ideal white light. Of course, color coordinates may be checked in a state where the pixels emitting red light emit light and it may be checked how different the color coordinates are from color coordinates of ideal red light; color coordinates may be checked in a state where the pixels emitting green light emit light and it may be checked how different the color coordinates are from color coordinates of ideal green light; and color coordinates may be checked in a state where the pixels emitting blue light emit light and it may be checked how different the color coordinates are from color coordinates of ideal blue light.

The preliminary inspection data obtained through the on-off test on the display module may be data with respect to an average luminance of the display area DA, may be data with respect to a difference between a maximum luminance and a minimum luminance of the display area DA, may be data with respect to color coordinates most different from normal color coordinates of the display area DA, or may be data with respect to a color coordinate difference according to a change in a viewing angle. The color coordinate difference according to the change in the viewing angle may be, for example, a difference between color coordinates in case that a viewing angle is about 0° and color coordinates in case that a viewing angle is about 45° in a state where white light is emitted from the display area DA. As another example, considering a gray scale in which black is represented by 0 and white is represented by 255, when gray represented by gray value about 48 is displayed in the entire display area DA for a preset time (e.g., about 60 seconds) (aging), half of the display area DA is displayed in black and the other half is displayed in white for a preset time (e.g., about 10 seconds) (stress application), and the gray represented by gray value about 48 is displayed in the entire display area DA again, in fact, the gray represented by gray value about 48 is not displayed in the entire display area DA, but a gray scale difference occurs between the area where the black is displayed and the area where the white is displayed and then, after time elapses, the difference disappears and the gray represented by gray value about 48 is displayed in the entire area. Accordingly, the preliminary inspection data may be data with respect to a time taken until the difference disappears. As another example, in case that the display module is driven at about 60 Hz and then driven at about 120 Hz, a flicker (periodic luminance change) may occur for a while. Accordingly, the preliminary inspection data may be data with respect to a time taken until the flicker disappears. As such, the preliminary inspection data may be prepared in various ways. Of course, the preliminary inspection data may include these different types of data. For reference, the data with respect to the difference between the maximum luminance and the minimum luminance of the display area DA may refer to data with respect to a difference between a luminance of a brightest portion and a luminance of a darkest portion in the display area DA.

In case that the preliminary inspection data is obtained, facility information data that is data with respect to manufacturing facilities used to manufacture the display panel included in the display module may be associated with the preliminary inspection data of the display module. In case that the facility information data is associated with the preliminary inspection data, it may mean that the facility information data and the preliminary inspection data are stored as a pair in a database. Facility information data may be obtained for each of display panels, a display module may be formed by attaching a printed circuit board and a driving chip to the display panel, preliminary inspection data may be obtained through an on-off test on the display module, and the facility information data may be associated with the preliminary inspection data. By repeatedly performing the above steps, a database in which the facility information data and the preliminary inspection data are connected to each other and stored may be established.

For reference, the database may store, as a facility causing abnormality, at least one of facilities used to manufacture a display panel included in a display module for which preliminary inspection data exceeding a preset range is obtained from among the preliminary inspection data.

Figure 8:
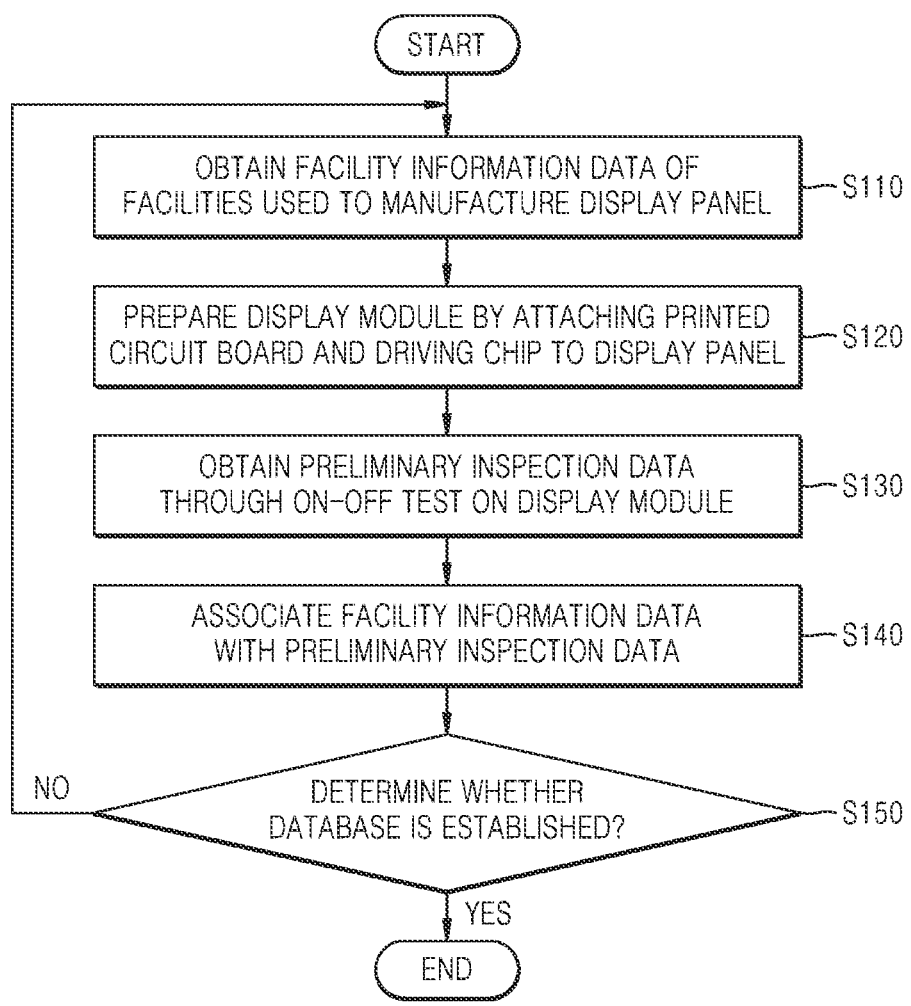
FIG. 8 is a flowchart schematically illustrating a method of determining whether a display manufacturing facility is abnormal, according to an embodiment.

FIG. 8 is a flowchart schematically illustrating a process of establishing a database. As described above, facility information data for a display panel may be obtained (S110), a display module may be prepared by attaching a printed circuit board and a driving chip to the display panel (S120), preliminary inspection data may be obtained through an on-off test on the display module (S130), the facility information data may be associated with the preliminary inspection data (S140), and a database may be established by performing this process (e.g., S110, S120, S130, and/or S140) on display panels (S150).

The established database may include facility data of a normal display panel, and preliminary inspection data of a normal display module prepared by using the normal display panel, and facility data of a normal display panel and preliminary inspection data of an abnormal display module prepared by using the normal display panel. In the abnormal display module, it may be determined which manufacturing facility caused defects from among manufacturing facilities used to manufacture the display panel.

For example, a first display panel may be manufactured by using a first cleaning device, a first CVD device, a first LTPS device, a first exposure device, a first sputtering device, and a first FMM deposition device. A second display panel may be manufactured by using the first cleaning device, the first CVD device, the first LTPS device, a second exposure device, the first sputtering device, and the first FMM deposition device. In case that a first display module is normal according to preliminary inspection data of the first display module made by using the first display panel, and a second display module is abnormal according to preliminary inspection data of the second display module made by using the second display panel, it may be determined that defects of the second display module were caused by the second exposure device.

Such determination may be made by using artificial intelligence.

Figure 9:
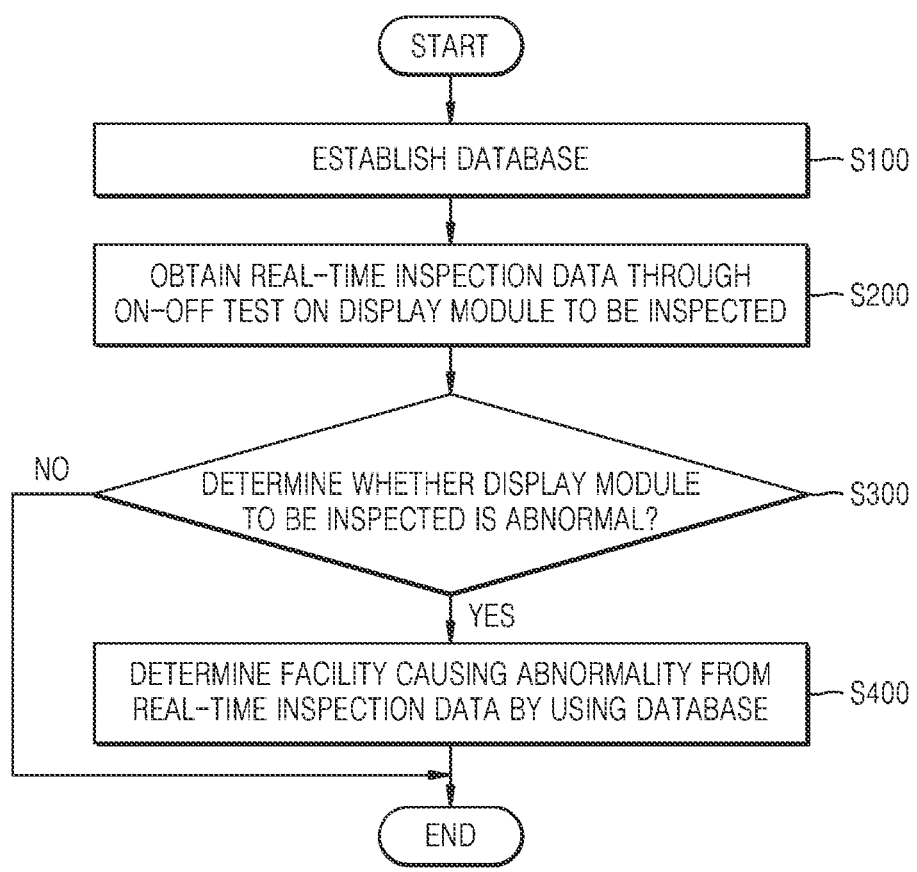
FIG. 9 is a flowchart schematically illustrating a method of determining whether a display manufacturing facility is abnormal, according to an embodiment.

After the database is established, in case that defects occur in a display module that is manufactured, it may be determined which manufacturing facility caused the defects. In detail, as shown in FIG. 9 that is a flowchart schematically illustrating a method of determining whether a display manufacturing facility is abnormal according to an embodiment, a database may be established (S100), and then a display panel may be manufactured by using manufacturing facilities, a display module, that is, a display module to be inspected, may be prepared by attaching a printed circuit board and a driving chip to the display panel, and then real-time inspection data may be obtained through an on-off test on the display module to be inspected (S200).

The real-time inspection data may have same physical characteristics as those of preliminary inspection data. For example, the real-time inspection data may be data with respect to an average luminance of the display area DA, may be data with respect to a difference between a maximum luminance and a minimum luminance of the display area DA, may be data with respect to color coordinates most different from normal color coordinates of the display area DA, or may be data with respect to a color coordinate difference according to a change in a viewing angle. The color coordinate difference according to the change in the viewing angle may be, for example, a difference between color coordinates in case that a viewing angle is about 0° and color coordinates in case that a viewing angle is about 45° in a state where white light is emitted from the display area DA. As another example, considering a gray scale in which black is represented by 0 and white is represented by 255, in case that gray represented by gray value 48 is displayed in the entire display area DA for a preset time (e.g., about 60 seconds) (aging), half of the display area DA is displayed in black and the other half is displayed in white for a preset time (e.g., about 10 seconds) (stress application), and the gray represented by gray value 48 is displayed in the entire display area DA again, in fact, the gray represented by gray value 48 is not displayed in the entire display area DA, but a gray scale difference occurs between the area where the black is displayed and the area where the white is displayed and then, after time elapses, the difference disappears and the gray represented by gray value 48 is displayed in the entire area. Accordingly, the real-time inspection data may be data with respect to a time taken until the difference disappears. As another example, in case that the display module is driven at about 60 Hz and then driven at about 120 Hz, a flicker (periodic luminance change) may occur for a while. Accordingly, the real-time inspection data may be data with respect to a time taken until the flicker disappears. As such, the real-time inspection data may be prepared in various ways. Of course, the real-time inspection data may include these different types of data. For reference, the data with respect to the difference between the maximum luminance and the minimum luminance of the display area DA may refer to data with respect to a difference between a luminance of a brightest portion and a luminance of a darkest portion in the display area DA.

It may be determined whether the display module to be inspected is normal from the obtained real-time inspection data (S300). In case that the display module to be inspected is normal, a procedure may end in FIG. 9. However, this may mean that a procedure of determining whether a display manufacturing facility is abnormal ends. For example, a subsequent display apparatus manufacturing procedure such as attaching a cover window may continue. In case that the display module to be inspected is abnormal, a facility causing abnormality may be determined from the real-time inspection data by using the database (S400).

For example, in case that a display panel included in the display module to be inspected that is determined as abnormal was manufactured by using a first cleaning device, a third CVD device, a first LTPS device, a first exposure device, a first sputtering device, and a first FMM deposition device, and a first display panel included in a first display module for which normal preliminary inspection data included in the database is obtained was manufactured by using the first cleaning device, a first CVD device, the first LTPS device, the first exposure device, the first sputtering device, and the first FMM deposition device, it may be determined that defects of the display module to be inspected were caused by the third CVD device. Accordingly, a maintenance procedure may be performed on the third CVD device, to prevent or minimize the display module having defects from being further manufactured.

Such determination may be made by using artificial intelligence.

The operation (S400) of determining the facility causing abnormality from the real-time inspection data by using the database may be performed in a manner different from that described above. The established database may store, as a facility causing abnormality, at least one of facilities used to manufacture a display panel included in a display module for which preliminary inspection data exceeding a preset range is obtained among preliminary inspection data. For example, in case that preliminary inspection data with respect to specific physical characteristics exceeds a preset range, for example, in case that preliminary inspection data with respect to an average luminance of the display area exceeds a preset average luminance range, the database may store, as a facility causing abnormality, at least one of facilities used to manufacture a display panel included in a display module for which the preliminary inspection data is obtained. In case that the display panel included in the display module for which the preliminary inspection data is obtained is the second display panel as described above, the database may include data with respect to a pair of the second exposure device and the preliminary inspection data indicating abnormality.

After the real-time inspection data is obtained through the on-off test on the display module to be inspected (S200), in case that the display module to be inspected is abnormal (S300), preliminary inspection data most similar to the real-time inspection data may be selected from among preliminary inspection data stored in the database. A facility used to manufacture a display panel included in the display module to be inspected, corresponding to a facility stored as the facility causing abnormality among facilities used to manufacture a display panel included in a display module for which the preliminary inspection data is obtained may be determined as a facility causing abnormality.

For example, the real-time inspection data obtained for the display module to be inspected that is determined as abnormal may be about an average luminance of the display area. In case that a display panel included in a display module for which preliminary data most similar to the average luminance is obtained is the second display panel as described above, because the database has information that the second exposure device caused defects in a process of manufacturing a display panel included in the display module having the average luminance, it may be determined that a facility causing defects of the display module to be inspected is the second exposure device. Accordingly, a maintenance procedure may be performed on the second exposure device, to prevent or minimize the abnormal display module from being further manufactured.

Such determination may be made by using artificial intelligence.

As another example, preliminary inspection data most similar to the real-time inspection data may be selected from among preliminary inspection data stored in the database, and a facility (or duplicate facility) used to manufacture a display panel of a display module for which the selected preliminary inspection data is obtained from among facilities used to manufacture a display panel included in the display module to be inspected may be determined as a facility causing abnormality.

For example, the real-time inspection data obtained for the display module to be inspected that is determined as abnormal may be about an average luminance of the display area. A display panel included in a display module for which preliminary data most similar to the average luminance is obtained may be the third display panel as described above. In case that the third display panel was manufactured by using a third cleaning device, a first CVD device, a first LTPS device, a second exposure device, a first sputtering device, and a first FMM deposition device and a display panel included in the display module to be inspected was manufactured by using the third cleaning device, a second CVD device, a fourth LTPS device, a fifth exposure device, a third sputtering device, and the first FMM deposition device, the third cleaning device or the first FMM deposition device may be determined as a facility causing abnormality of the display module to be inspected. Accordingly, a maintenance procedure may be performed on the third cleaning device or the first FMM deposition device, to prevent or minimize the abnormal display module from being further manufactured.

Such determination may be performed by using artificial intelligence.

Figure 10:
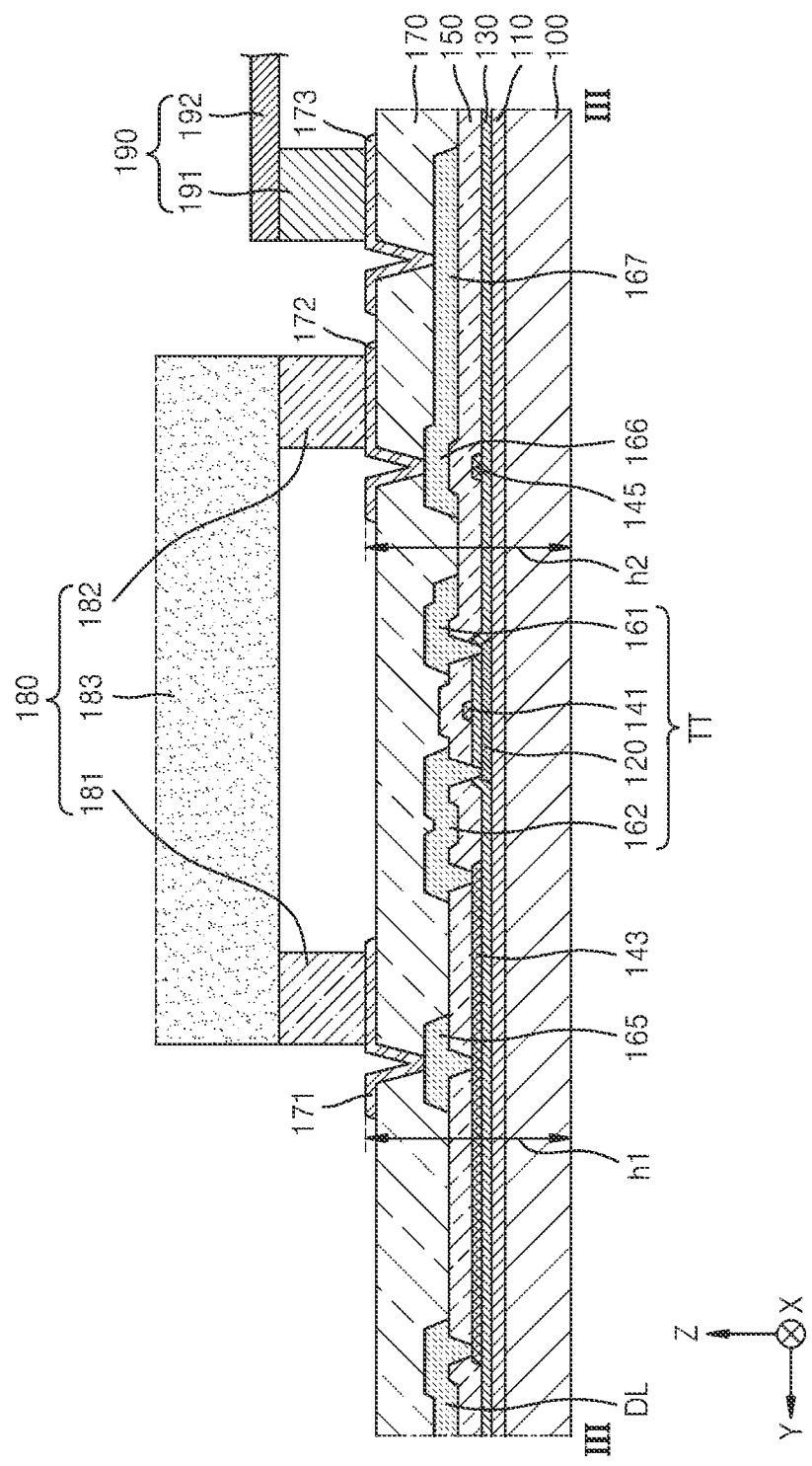
FIG. 10 is a cross-sectional view schematically illustrating a state during a process of manufacturing a display apparatus in a method of determining whether a display manufacturing facility is abnormal, according to an embodiment.

FIG. 10 is a cross-sectional view schematically illustrating a state during a process of manufacturing a display apparatus in a method of determining whether a display manufacturing facility is abnormal, according to an embodiment. As described above with reference to FIG. 5, the planarization layer 170 may be located in the display area DA. The planarization layer 170 may also be located in the peripheral area PA. FIG. 10 is a cross-sectional view schematically illustrating a portion of the peripheral area PA of a display module in the above case, which may be a modification of a display module of FIG. 7.

As shown in FIG. 10, the planarization layer 170 may cover the input pads 166 and the output pads 165. Accordingly, additional input pads 172 and additional output pads 171 may be located on the planarization layer 170 to respectively correspond to the input pads 166 and the output pads 165. The additional input pads 172 and the additional output pads 171 may be connected to the input pads 166 and the output pads 165 under the additional input pads 172 and the additional output pads 171 through contact holes formed in the planarization layer 170. The additional input pads 172 may be connected to the input pads 182 of the driving chip 180, and the additional output pads 171 may be connected to the output terminals 181 of the driving chip 180. The additional input pads 172 and the additional output pads 171 may include a same material, for example, ITO, IZO, and/or $In_2O_3$, as the pixel electrode 311 of the display device 310 in the display area DA.

Because the planarization layer 170 covers the input pads 166, the planarization layer 170 may cover the portions 167 of the input pads 166 far from the test thin-film transistors TT. Accordingly, additional signal pads 173 may be located on the planarization layer 170, to correspond to the portions 167 of the input pads 166 far from the test thin-film transistors TT. The additional signal pads 173 may be connected to the portions 167 of the input pads 166 under the additional signal pads 173 through contact holes formed in the planarization layer 170. The additional signal pads 173 may be connected to the output terminals 191 of the printed circuit board 190. The additional signal pads 173 may include a same material, for example, ITO, IZO, and/or $In_2O_3$, as the pixel electrode 311 of the display device 310 in the display area DA.

However, the disclosure is not limited thereto, and a display panel, a display module, and/or a display apparatus may have a layer structure different from that illustrated in FIG. 10. For example, an additional insulating layer may be located under the pixel electrode 311, and an additional wiring layer may be located between insulating layers.

Although a facility causing defects is determined from among manufacturing facilities used to manufacture a display panel included in a display module from real-time inspection data for the display module, the facility causing defects may refer to not only a facility having abnormality itself but also a facility for which a condition or the like is incorrectly set. For example, an exposure device for which a condition such as an exposure time or an intensity of light is incorrectly set may be determined as a facility causing defects.

Although a method of determining whether a display manufacturing facility is abnormal has been mainly described, a method of manufacturing a display apparatus using the method of determining whether a display manufacturing facility is abnormal may also be included in the scope of the disclosure. For example, inspection data may be obtained by using an established database as described above with reference to FIG. 9, a facility causing abnormality may be determined from real-time inspection data by using the database in case that a display module to be inspected is abnormal through the inspection data, a maintenance procedure may be performed on the facility, and then a display apparatus manufacturing process may be performed.

According to an embodiment, there may be provided a method of determining whether a display manufacturing facility is abnormal to readily check whether defects have occurred in a manufacturing process. However, the scope of the disclosure is not limited by these effects.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A method of determining whether a display manufacturing facility is abnormal, the method comprising:
   a first step of obtaining facility information data of facilities used to manufacture a display panel;
   a second step of preparing a display module by attaching a printed circuit board and a driving chip to the display panel;
   a third step of obtaining preliminary inspection data through an on-off test on the display module;
   a fourth step of associating the facility information data with the preliminary inspection data;
   establishing a database by repeatedly performing the first step to the fourth step;
   obtaining real-time inspection data through an on-off test on a display module to be inspected;
   determining, from the real-time inspection data, whether the display module to be inspected is normal; and,
   determining a facility causing abnormality of the display module, from the real-time inspection data by using the database in case that the display module to be inspected is determined to be abnormal.

2. The method of claim 1, wherein the preliminary inspection data and the real-time inspection data are data with respect to same physical characteristics.

3. The method of claim 1, wherein the preliminary inspection data and the real-time inspection data comprise any one of:
   data with respect to an average luminance of a display area;
   data with respect to a difference between a maximum luminance and a minimum luminance of the display area; and
   data with respect to color coordinates most different from normal color coordinates of the display area.

4. The method of claim 1, wherein the database stores, as a facility causing abnormality, at least one of facilities used to manufacture a display panel included in a display module for which preliminary inspection data exceeding a preset range is obtained.

5. The method of claim 4, wherein the determining of the facility causing abnormality comprises:
   selecting preliminary inspection data most similar to the real-time inspection data from among the preliminary inspection data stored in the database; and
   determining, as a facility causing abnormality, a facility used to manufacture a display panel included in the display module to be inspected, corresponding to a facility stored as the facility causing abnormality from among facilities used to manufacture a display panel included in a display module for which the preliminary inspection data is obtained.

6. The method of claim 1, wherein the determining of the facility causing abnormality comprises:
   selecting preliminary inspection data most similar to the real-time inspection data from among the preliminary inspection data stored in the database; and
   determining, as a facility causing abnormality, a facility used to manufacture a display panel included in a display module for which the preliminary inspection data is obtained from among facilities used to manufacture a display panel included in the display module to be inspected.

* * * * *